United States Patent
Cobb et al.

(10) Patent No.: US 10,640,393 B2
(45) Date of Patent: May 5, 2020

(54) FAUCET CONVERSION SYSTEM

(71) Applicant: WHIRLPOOL CORPORATION, Benton Harbor, MI (US)

(72) Inventors: Dominique Cobb, St. Joseph, MI (US); Erdogan Ergican, St. Joseph, MI (US); Wyndham F. Gary, Jr., St. Joseph, MI (US); Mark Graff, Michigan City, IN (US); Eric Hill, Chicago, IL (US); Beth Jackson, St. Joseph, MI (US); Antony Kirk, Chicago, IL (US); Steven J. Kuehl, St. Josepoh, MI (US); Joseph R. Peters, St. Joseph, MI (US); Michael Seeley, South Haven, MI (US); Rex D. Wilson, Berrien Springs, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 180 days.

(21) Appl. No.: 15/850,016

(22) Filed: Dec. 21, 2017

(65) Prior Publication Data
US 2018/0186655 A1 Jul. 5, 2018

Related U.S. Application Data

(60) Provisional application No. 62/440,175, filed on Dec. 29, 2016.

(51) Int. Cl.
*C02F 1/00* (2006.01)
*E03C 1/05* (2006.01)
(Continued)

(52) U.S. Cl.
CPC ............. *C02F 1/008* (2013.01); *C02F 1/003* (2013.01); *C02F 9/005* (2013.01); *E03C 1/044* (2013.01);
(Continued)

(58) Field of Classification Search
CPC .......... C02F 1/001; C02F 1/003; C02F 1/008; C02F 1/283; C02F 1/68; C02F 1/78;
(Continued)

(56) References Cited

U.S. PATENT DOCUMENTS

| | | |
|---|---|---|
| 5,915,851 A | 6/1999 | Wattrick et al. |
| 8,118,240 B2 | 2/2012 | Rodenbeck et al. |

(Continued)

FOREIGN PATENT DOCUMENTS

| | | |
|---|---|---|
| DE | 19618319 A1 | 11/1997 |
| EP | 2672027 A1 | 12/2013 |

(Continued)

*Primary Examiner* — Terry K Cecil
(74) *Attorney, Agent, or Firm* — Nyemaster Goode, P.C.

(57) ABSTRACT

A water treatment apparatus that includes: at least one module which operatively and selectively treats one or both of an original household hot water received from the household hot water line and water flowing through the module and treats cold water received from an original household cold water line that flows through; a process control unit whereby a user selects a desired treatment option for the water flowing through the apparatus to be dispensed to the user; one or more plumbing connections which operatively divert the original household hot and cold water flow to the user selected water treatment module so as to dispense to the user the selected treated water; and one or more valves which operatively cooperate with the process control unit to direct the water flow within the apparatus so as to provide the user with the selected treated water.

18 Claims, 10 Drawing Sheets

(51) Int. Cl.
*C02F 9/00* (2006.01)
*E03C 1/044* (2006.01)
*E03C 1/04* (2006.01)
*C02F 1/78* (2006.01)
*C02F 101/32* (2006.01)
*C02F 1/28* (2006.01)
*C02F 1/68* (2006.01)

(52) U.S. Cl.
CPC ............ *E03C 1/0411* (2013.01); *E03C 1/055* (2013.01); *C02F 1/001* (2013.01); *C02F 1/283* (2013.01); *C02F 1/68* (2013.01); *C02F 1/78* (2013.01); *C02F 2101/322* (2013.01); *C02F 2201/005* (2013.01); *C02F 2201/007* (2013.01); *C02F 2209/005* (2013.01); *C02F 2209/02* (2013.01); *C02F 2209/40* (2013.01); *C02F 2307/06* (2013.01); *E03C 2201/40* (2013.01); *E03C 2201/45* (2013.01)

(58) Field of Classification Search
CPC .......... C02F 2101/322; C02F 2201/005; C02F 2201/007; C02F 2209/005; C02F 2209/02; C02F 2209/40; C02F 2307/06; C02F 9/005; E03C 1/0411; E03C 1/044; E03C 1/055; E03C 2201/40; E03C 2201/45

See application file for complete search history.

(56) References Cited

U.S. PATENT DOCUMENTS

| | | | |
|---|---|---|---|
| 8,162,236 | B2 | 4/2012 | Rodenbeck et al. |
| 8,365,767 | B2 | 2/2013 | Davidson et al. |
| 8,365,959 | B2 | 2/2013 | Tavolazzi |
| 8,591,736 | B2 * | 11/2013 | Kruckenberg ......... B01D 35/30 210/232 |
| 8,671,979 | B2 | 3/2014 | Gioira et al. |
| 9,174,845 | B2 | 11/2015 | Lynn |
| 9,194,110 | B2 | 11/2015 | Frick et al. |
| 9,243,756 | B2 | 1/2016 | Davidson et al. |
| 10,227,758 | B2 * | 3/2019 | Tang ...................... E03C 1/044 |
| 2003/0137896 | A1 | 7/2003 | Spiegel |
| 2009/0044873 | A1 | 2/2009 | Walter |
| 2010/0021598 | A1 | 1/2010 | Lynn |
| 2012/0067437 | A1 | 3/2012 | Xia |
| 2013/0142704 | A1 | 6/2013 | Lynn |
| 2013/0195725 | A1 | 8/2013 | Lynn |
| 2014/0352799 | A1 | 12/2014 | Rosko et al. |
| 2015/0037464 | A1 | 2/2015 | McHale et al. |
| 2015/0251922 | A1 | 9/2015 | Schuster |
| 2016/0076233 | A1 | 3/2016 | Parikh et al. |

FOREIGN PATENT DOCUMENTS

| | | |
|---|---|---|
| ES | 2212864 A1 | 8/2004 |
| WO | 2007113663 A2 | 10/2007 |
| WO | 2013086217 A1 | 6/2013 |
| ZA | 8305872 A | 4/1984 |

* cited by examiner

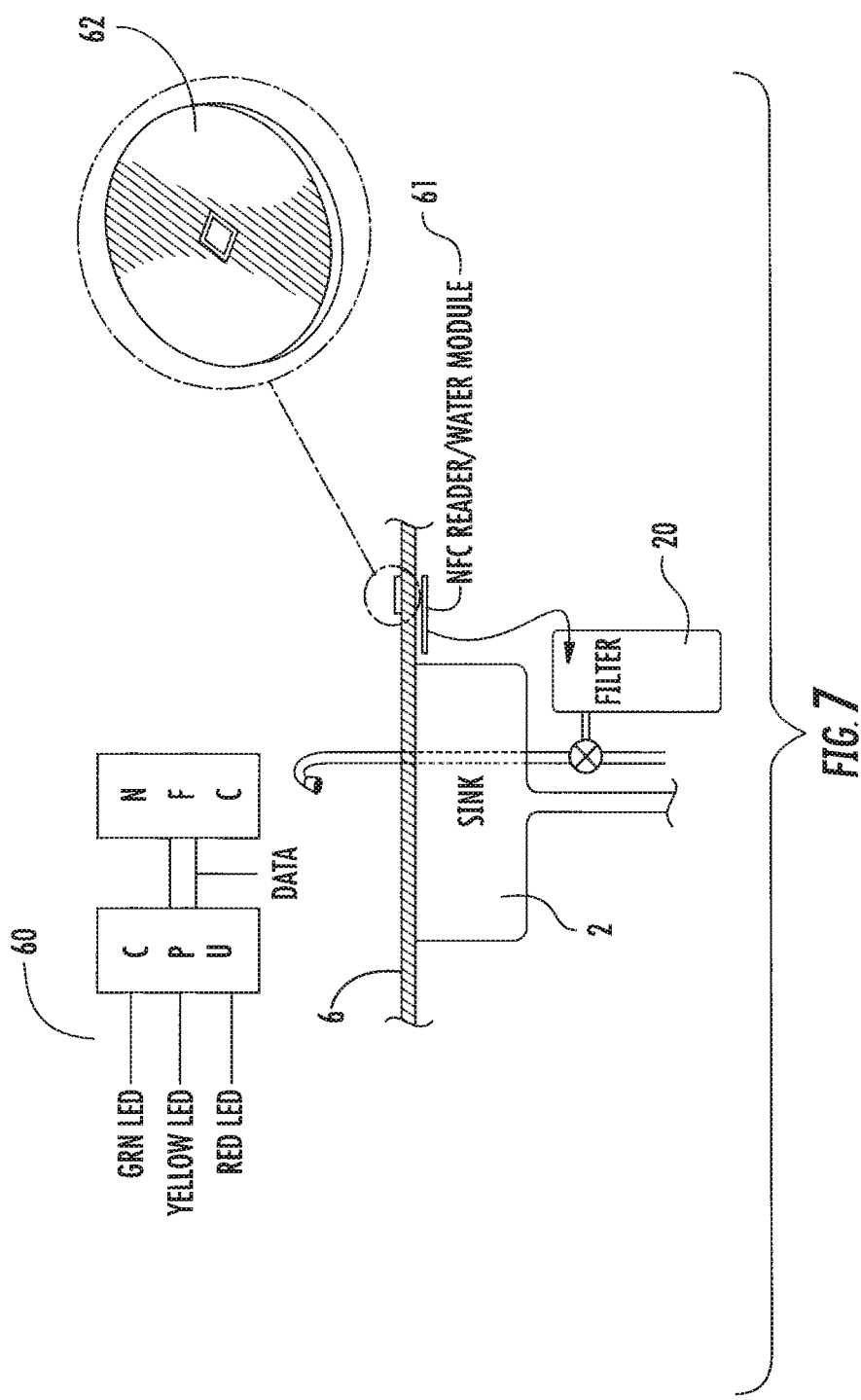

FAUCET CONVERSION SYSTEM

CROSS-REFERENCE TO RELATED APPLICATION

This application claims priority to U.S. Provisional Patent Application Ser. No. 62/440,175, filed on Dec. 29, 2016, entitled "FAUCET CONVERSION SYSTEM", the disclosure of which is hereby incorporated by reference in its entirety.

FIELD

The present disclosure generally relates to water faucet and faucet systems. More particularly, a multifaceted faucet system is disclosed related to the treatment of water for human consumption. The system is designed to be retrofitted onto existing sink/faucet assemblies as found in the typical house, apartment, small business, or other dwelling or location where potable water is delivered for use.

BACKGROUND

As issues and concerns regarding the world's water supply grow, there has been an ever increasing interest by consumers in obtaining cleaner water for drinking and various treated water for consumption and use. This interest has been reflected in the growth of the use of carbon activated filters and, more recently, in the use of ozonation equipment.

When installed for in-home use, multifaceted water treatment systems are frequently built into the original kitchen design and construction. For aftermarket use, such systems exist whereby the existing faucet assembly must be replaced and new holes must be made in the countertop area in proximity to the sink and substantial other construction also must be done. In both instances, the cost is substantial, which has deterred retrofitting existing faucets and kitchens with improved water systems. With the aftermarket system described above, in addition to the installation processes, even if implemented the end result may present a cluttered sink area occupied by various hardware necessitated to operate the various features of the newly installed water treatment system.

SUMMARY

These and other aspects, objects, and features of the present disclosure will be understood and appreciated by those skilled in the art upon studying the following specification, claims, and appended drawings. The present disclosure is not to be limited to or by these objects, features, and advantages. No single embodiment need provide each and every object, feature, or advantage.

An aspect of the present disclosure is generally directed to a water treatment apparatus system that includes: at least one module which operatively and selectively treats one or both of an original household hot water received from the household hot water line and water flowing through the module and treats cold water received from an original household cold water line that flows through; a process control unit whereby a user selects a desired treatment option for the water flowing through the apparatus to be dispensed to the user; one or more plumbing connections which operatively divert the original household hot and cold water flow to the user selected water treatment module so as to dispense to the user the selected treated water; and one or more valves which operatively cooperate with the process control unit to direct the water flow within the apparatus so as to provide the user with the selected treated water.

Yet another aspect of the present disclosure includes a water treatment apparatus having: at least one module which operatively treats the water flowing through the module and treats cold water received from an original household cold waterline that flows through; a process control unit whereby a user selects a desired treatment option for the water flowing through the apparatus to be dispensed to the user wherein the desired treatment options include filtered water and one or more of; on-demand hot water at a temperature of from about 180° F. to about 212° F.; on-demand cold water at a temperature of from about 43° F. to about 32° F.; and ozonation; one or more plumbing connections which operatively divert the original household hot or cold water flow to the user selected water treatment module so as to dispense to the user the selected treated water; one or more valves which operatively cooperate with the process control unit to direct the water flow within the apparatus so as to provide the user with the selected treated water; and a near-field communication (NFC) system operatively connected to one or more modules of the apparatus which provides apparatus status information to the user by way of a NFC reader and an NFC tag token that is not physically connected to any other component of the water treatment apparatus and wherein the NFC tag token does not include a battery, but includes a processor that is processed by the NFC reader and records filter use information and indicates to a user when filtered water is not being provided when positioned proximate the reader and after the useful life of a water filter delivering the filtered water.

Another aspect of the present disclosure is generally directed to a method for the treatment of water for use by the user utilizing a multifaceted water treatment apparatus that includes the steps of: selecting the desired water treatment process by the user using the control system; actuating valves using the control system to divert the water stream flow to the desired water treatment module within the apparatus; initiating the flow of water through the apparatus by a user by the user opening the faucet; and dispensing the treated water through the faucet to the user. The method may also include the step of retrofitting the apparatus into an existing faucet system in the kitchen by connecting the hot and cold water household lines under the kitchen cabinet with the apparatus. Additionally, any combination of the various treatments discussed herein may be employ by the apparatus under the method.

BRIEF DESCRIPTION OF THE DRAWINGS

FIG. 7 is a front schematic view showing the near field communication (NFC) apparatus which may be incorporated for use within a multifaceted water treatment system as disclosed herein.

DETAILED DESCRIPTION OF THE EMBODIMENTS

One object of the present disclosure includes the introduction of a water treatment system for in-home and other uses whereby the user may obtain water subjected to a variety of treatments. Such treatments may include the use of one or more filtration processes and the provision of instant hot water, instant cold water, instant carbonated water and/or instant ozonated water.

Another object of the present disclosure is the ability to retrofit the water treatment system to the existing plumbing configuration of the sink/faucet without the need of creating additional holes in the countertop adjacent to the sink or otherwise installing additional plumbing hardware above the counter level in proximity to the faucet assembly.

Another object of the present disclosure is the use of valve assemblies which operate to drain away substantially all water within the dispensing lines which actions function to preserve the pristine character of the water being discharged on the next use by the consumer.

Another object of the present invention is the use of one or more filters upstream of the other water treatment modules which serves to remove any particulate matter and further provide pretreatment steps to the water dispensed for human consumption or use.

Another object of the present invention is the use of touch capacitor controls in combination with control electronics which function to conveniently and quickly provide control to the user as to the desired water treatment(s) for the water to be dispensed and, further, provides safety regulation of the system by automatically resetting the modules of the system and serving to interlock the system to prevent the use of inconsistent treatment features.

One aspect of the present disclosure provides for the automated dispensing of normal hot water, original household hot water, as may be used for washing dishes, instant hot water as may be used for making hot tea or other hot drinks, original household cold water as may be used for rinsing, cooking or for hand washing, and chilled water as may be used for drinking or cooking.

Another aspect of the present disclosure provides for the automated dispensing of ozonated water as may be used for drinking or for rinsing and sanitizing of foodstuffs, hands, dishes, and the like.

Another aspect of the present disclosure provides for the automated dispensing of carbonated water as may be used for drinking or in cooking.

Another aspect of the present disclosure provides for the automated dispensing of filtered water as may be used for drinking or in cooking.

Another aspect of the present disclosure provides for the use of a near field communication (NFC) apparatus for the purpose of monitoring the status of the multifaceted water treatment apparatus including any filter elements which do require periodic replacement.

Figure 1:
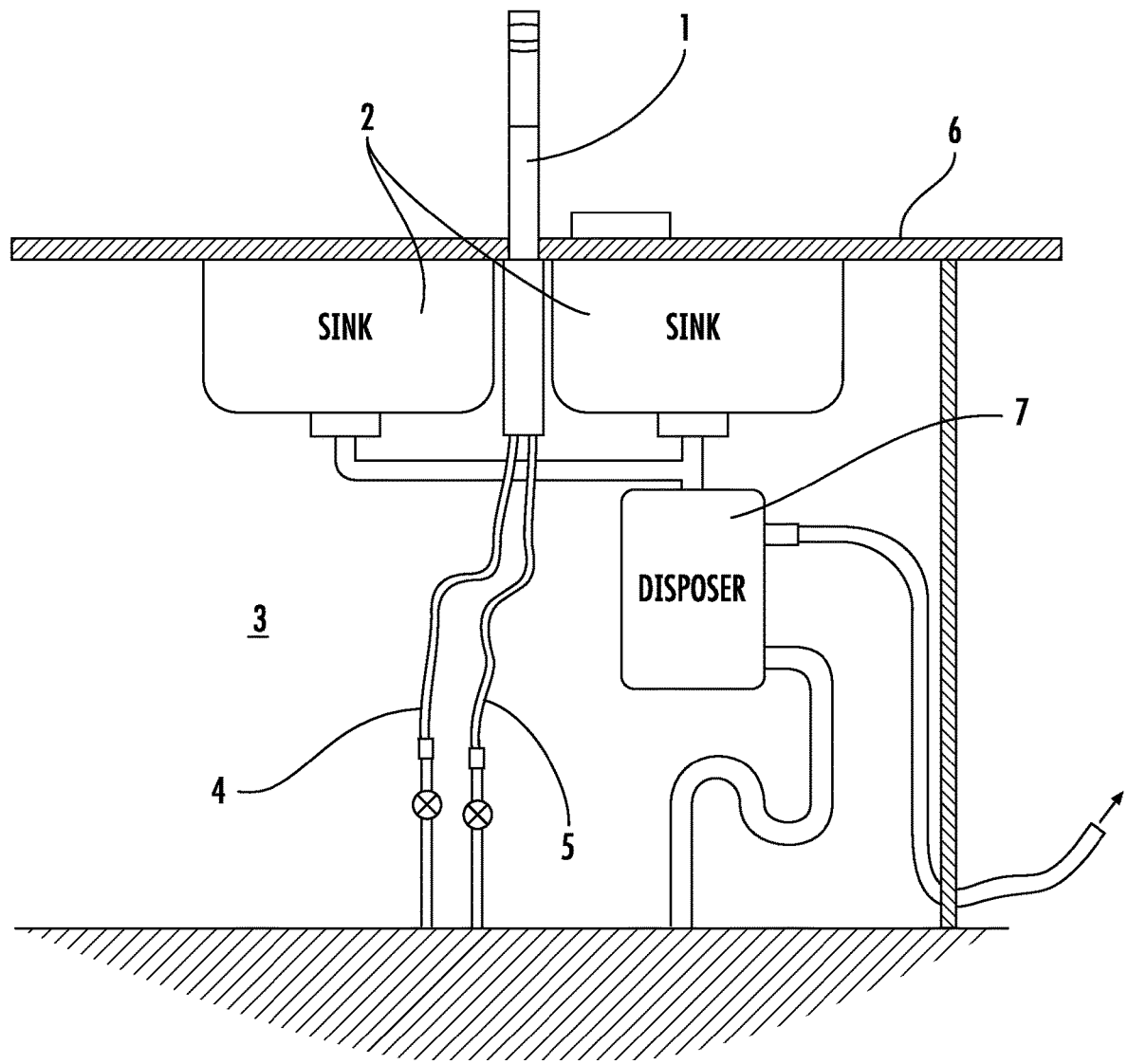
FIG. 1 is a front schematic view showing the undersink positioning of apparatus, plumbing and faucet apparatus as may exist in a typical kitchen.

With reference to the Figures, FIG. 1 shows a current configuration of a typical undersink cabinet area 3 including the original household hot water line 4 and original household cold water line 5 which service the faucet 1. The sink(s) 2 may be a double sink or a single sink basin such as a farmhouse or apron sink. The sink may also have more than two chambers as well. Typically, the kitchen sink systems of the present disclosure will also employ a disposer 7. The sink may be mounted on the top or bottom surface of the counter 6.

Figure 2:
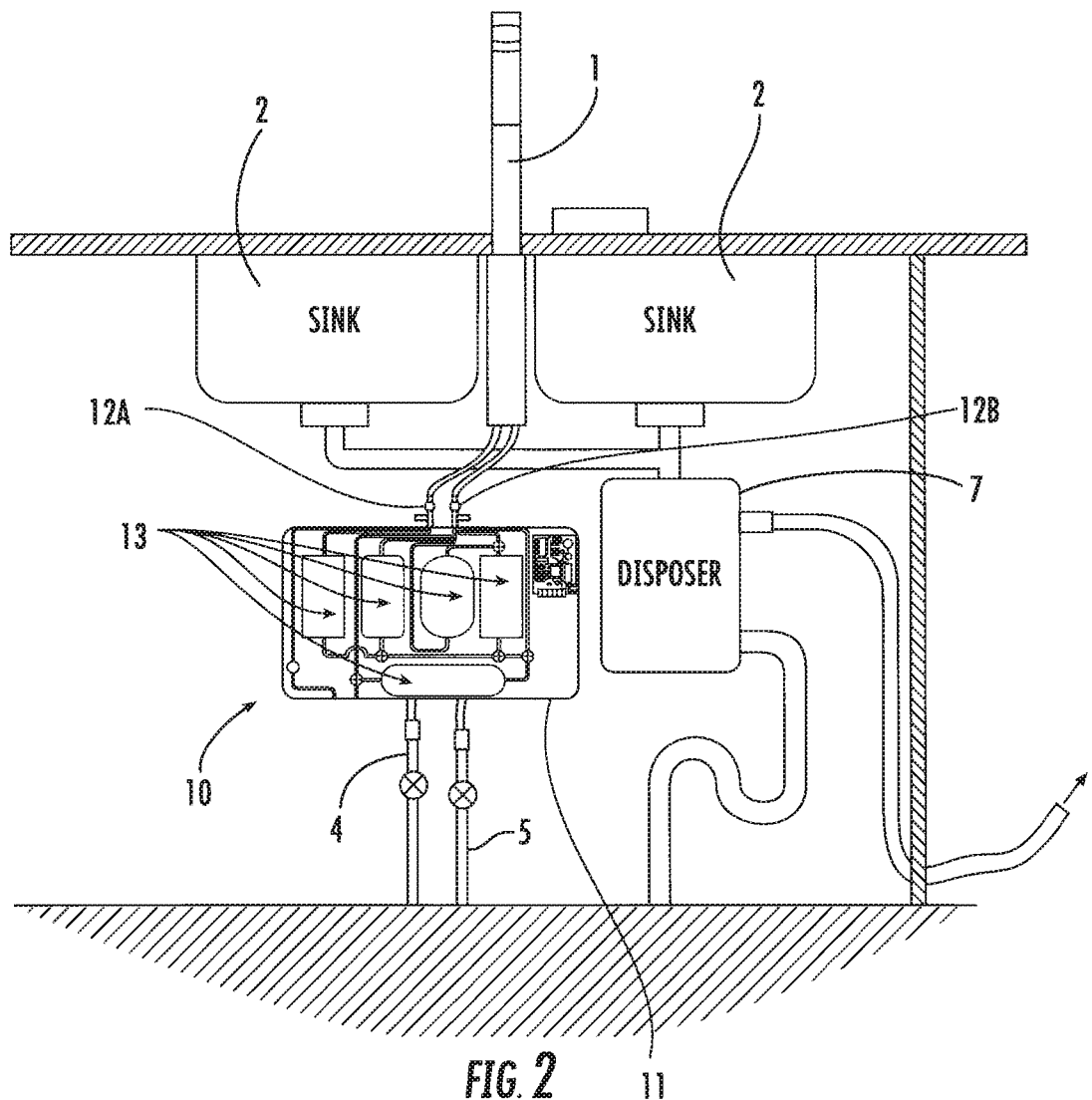
FIG. 2 is a frontal schematic view showing the undersink positioning of a multifaceted water treatment apparatus as disclosed herein.

FIG. 2 shows where the typical sink 2 may be retrofitted with a multifaceted water treatment apparatus 10 of the present disclosure. As configured, the apparatus 10 may be installed by splicing into the original household hot water line 4 and original household cold water line 5, which service normally connected directly to the faucet. The apparatus 10 accepts the inflow from the original household cold water line 5, processes the water stream as required by the user, and dispenses the treated water through the faucet 1 which is operatively connected to the hot water outlet port 12a and the cold water outlet port 12b.

Figure 3:
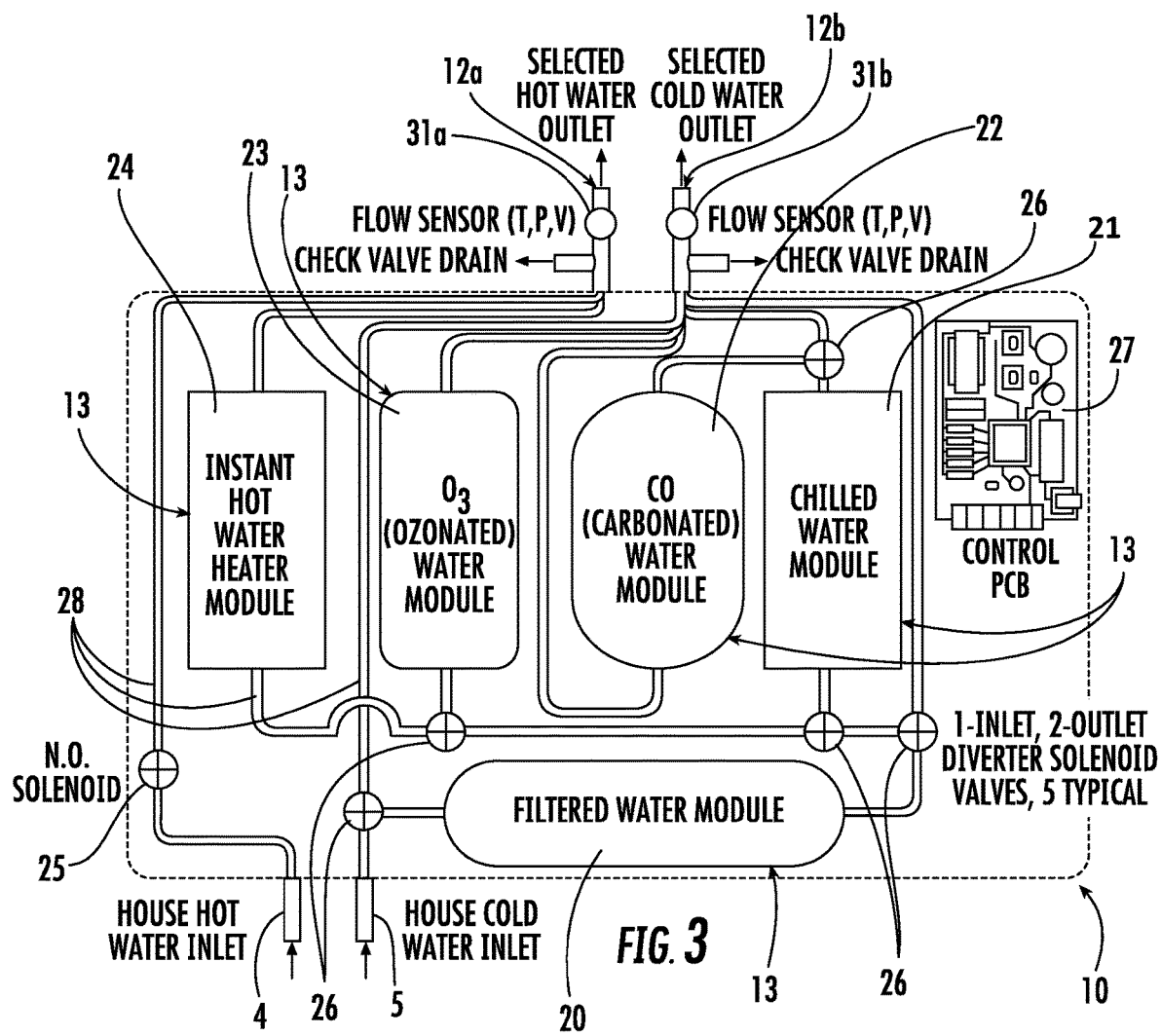
FIG. 3 is a schematic view of a multifaceted water treatment apparatus as disclosed herein.

By reference to FIG. 3, a multifaceted water treatment apparatus 10 as disclosed herein may contain one or more of a variety of modules 13. Typically, each module 13 accomplishes a separate and distinct water treatment step, but conceivably the system could, for example, have two similar treatments of different strength or efficacy. As shown, the apparatus 10 is fluidically positioned to accept the inflow from the original household hot water line 4 and original household cold water line 5. In one embodiment, the apparatus 10 may consist of a housing 11 which may sit on the floor of the undersink cabinet 3 or be mounted to the side or back wall or on stands sitting off of the cabinet floor. Conceivably the unit could also be mounted to the underside of the sink basin itself. If space or other considerations dictate, while not typically done, the apparatus may be mounted remote from the undersink cabinet so long as appropriate plumbing connections are utilized.

Within the apparatus 10 the water connections are the typical soldered or compression fit connection. Electrical connection is via a power cord or hardwired into the circuit, typically the circuit servicing the garbage disposer when present.

The apparatus 10 may also employ an electronic control system (ECS). The ECS may include a control panel 40, a central processing unit (CPU) 27 shown on FIG. 3 as the Control, printed circuit board C (PCB), and is electrically connected to at least the valves 25, 26, but may be connected to any and all valves used in the system. The ECS may also include the CPU 27, the hot water flow sensor 31a and cold water flow sensor 31b, and the touch capacitor control panel 40, or other control member, which allows the user to select the desired functionality of the apparatus, and the electronically controlled valves 25, 26 and modules 13. The ESC controls and acts cooperatively with at least the valves 25, 26 to direct the water flow and, further, turn on or otherwise actuate the modules 13 within the apparatus 10 as selected by the user for treating the water stream. The ECS 40 may also be a stand-alone apparatus that communicates with the CPU 27 via wireless signals, such as NFC, Bluetooth, WAN, or other wireless communication protocols. The ECS 40 may be a battery powered unit that may be installed in an convenient location such as next to the faucet, on a nearby counter, attached to a nearby cabinet either on a side or on the underside of the cabinet, or anywhere else it may be convenient for a user to place the unit 40. The battery used in the ECS may be a rechargeable battery, which may be able to be plugged in a recharged when the battery is almost completely discharged.

A number of valves 25, 26 are employed within the apparatus to direct the water flow pursuant to the choices made by the user. As below noted, the original household hot water line 4 preferably employs a normally open (N.O.) solenoid valve 25 or other electromechanically actuated water valve. Preferably, the other valves 26 used within the apparatus are 1-inlet, 2-outlet diverter solenoid valves, which are cant oiled by way of electromechanical actuation.

Within the apparatus 10 are positioned various modules 13, each of which provide a differing treatment function for the water. As illustrated schematically in FIG. 3, the original household hot water line 4 is connected and routed so as to have a continuous flow path that is preferably fitted with a normally open (N.O.) solenoid valve 25, which is closed only as required so as to allow water to flow from the hot water heater module 24 to the faucet 1. On the original household cold water line 5, there is shown a valve 26 that functions to allow the original household cold water line 5 flow to bypass the apparatus 10 and flow directly to the faucet 1, or diverts the original household cold water line flow 4 into the apparatus 10. As the water flows into the apparatus 10, it is preferably subjected to a first processing to pretreat the water via filtration or other processing methods within a water filter module 20.

At the pretreatment stage, the water filter module 20 may be a single stage line pressure filter such as used in refrigerators (i.e., U.S. Pat. No. 8,591,736 entitled Water Filter Unit). Alternative embodiments may employ a water filter module 20 having multiple filters or staged filtration including a prefilter for removal of larger particulates, a carbon block filter stage for removal of volatile organic compounds (VOCs) and smaller particulate and cysts, a biological stage filter for bacteria removal, a viral filtration stage, and stage wherein the water stream is deionized to make it softer. Alternate embodiments may also include a filtered water module that is plumbed in a manner to allow by user's choice original household cold water line 5 flow to bypass this pretreatment step and to flow directly to any one or more of the other treatment modules 13 within the apparatus.

After passing through the water filter module 20, it is preferred that an in-line inlet, outlet diverter valve 26, which can be driven by a stepper or solenoid actuator inlet, be employed so as to direct the cold water flow. This valve would function to direct the filtered water to flow directly to the cold water outlet port 12b or to divert the filtered water into a line that is connected to a variety of one or more other water treatment modules 13.

One such module 13 is the cold water chiller module 21, which operates to chill the water to a specific, typically user set, desired level above freezing. In the embodiment as shown in FIG. 3, a valve 26 accepting the water stream exiting from the cold water chiller module 21 operates upon the user's choice to either direct the chilled water to the cold water outlet port 12b or to divert the water stream to the carbonation module 22. Within the carbonation module 22, carbon dioxide gas accessed remotely from a gas cylinder or other source is dissolved into the chilled waterflow in a batch or continuous system configuration. The carbonation module 22 can contain carbonated water that is displaced by fresh inlet chilled water or carbonation may occur during the chilled water flow through the module 22. The treated water flows directly from this module 22 to the cold water outlet port 12b for dispensing through the faucet 1.

Within the apparatus 10 as shown, the filtered water may be directly routed to an ozonator module 23 where the water is mixed with ozone gas. Ozone is occasionally referred to as "enhanced oxygen" or "activated oxygen." It contains three atoms of oxygen ($O_3$) rather than the two atoms structure $O_2$) that is of abundance in the atmosphere. Ozone exists in nature and is a colorless gas that has a slight odor which odor is more frequently noted after a spring electrical thunderstorm. Ozone is a very unstable gas meaning that it readily converts from s chemical configuration to differing chemical configurations, primarily reverting back to the $O_2$ configuration. A primary method for ozone production is the use of ozone generators which customarily employ electrical stimulation or ultraviolet (UV) stimulation to convert $O_2$ molecules to $O_3$ molecules. Chemically, ozone is one of the strongest oxidants of the common oxidizing agents. Ozone is understood to have high disinfectant capacity. Various benefits attributed to the ozonation of water include disinfection at rates much faster than Chlorine, inactivation of viruses, removal of Iron and Manganese from the water, and contributions to the removal of low contamination rates of pesticides. Further, the use of an ozone disinfection method operates to remove pathogens without forming excessive disinfection byproducts (DBPs). The U.S. Environmental Protection Agency (EPA) has listed ozone as a "compliance" in the requirements of the Surface Water Treatment Rule applicable to drinking water systems.

Consumers are also increasingly interested in carbonated or sparkling water. Many purchase canned or bottled carbonated water such as Perrier® for regular consumption. The in-home use of carbonated water is growing, and there is an additional growing demand for receiving instant hot or cold water from the faucet.

In the preferred embodiment, the ozone is obtained by use of a corona discharge ozone generator or a Polymer-Electrolyte-Membrane (PEM) cell ozone generator positioned within or remote to the module 23. The ozonated water stream emerging from this module 23 flows directly to the cold water outlet port 12b.

In an alternative embodiment not shown in FIG. 3, water may be routed directly from the cold water chiller module 21 to the ozonator module 23 so as to enhance the level of ozone dissolved into the chilled water stream.

Within the apparatus 10 as shown, the filtered water may be routed by the user to the hot water heater module 24, wherein the water is quickly heated to a preset, typically user defined, temperature. Typically this temperature is near boiling, which temperature is required to allow for brewing of hot beverages, dissolving food or drink concentrates, or the like. The user directs this flow using the apparatus control panel 40, which actuates the valves 25, 26 so as to direct the route of the water stream as it passes through the apparatus 10 while closing the inflow from the original household hot water line 4.

In alternative embodiments, one or more of the modules 13 may not be employed. Accordingly, for example, the apparatus 10 may not contain an ozonator module 23 or a water filter module 20 or other of the disclosed modules 13. The use of the filtered water module 20 as disclosed in the embodiment as shown in FIG. 3 is preferred as this pretreatment step tends to enhance the performance of the other respective modules 13 and reduce potential issues with calcium deposits or other mineral contamination within the modules 13 of the apparatus 10.

It is preferred that the multifaceted water treatment apparatus 10 be supplied only with potable water from a municipal water system or other known potable source(s) such as a certified well. Use of such water sources should operate to provide for reduced issues of contamination and longer useful life of the apparatus 10.

Figure 4:
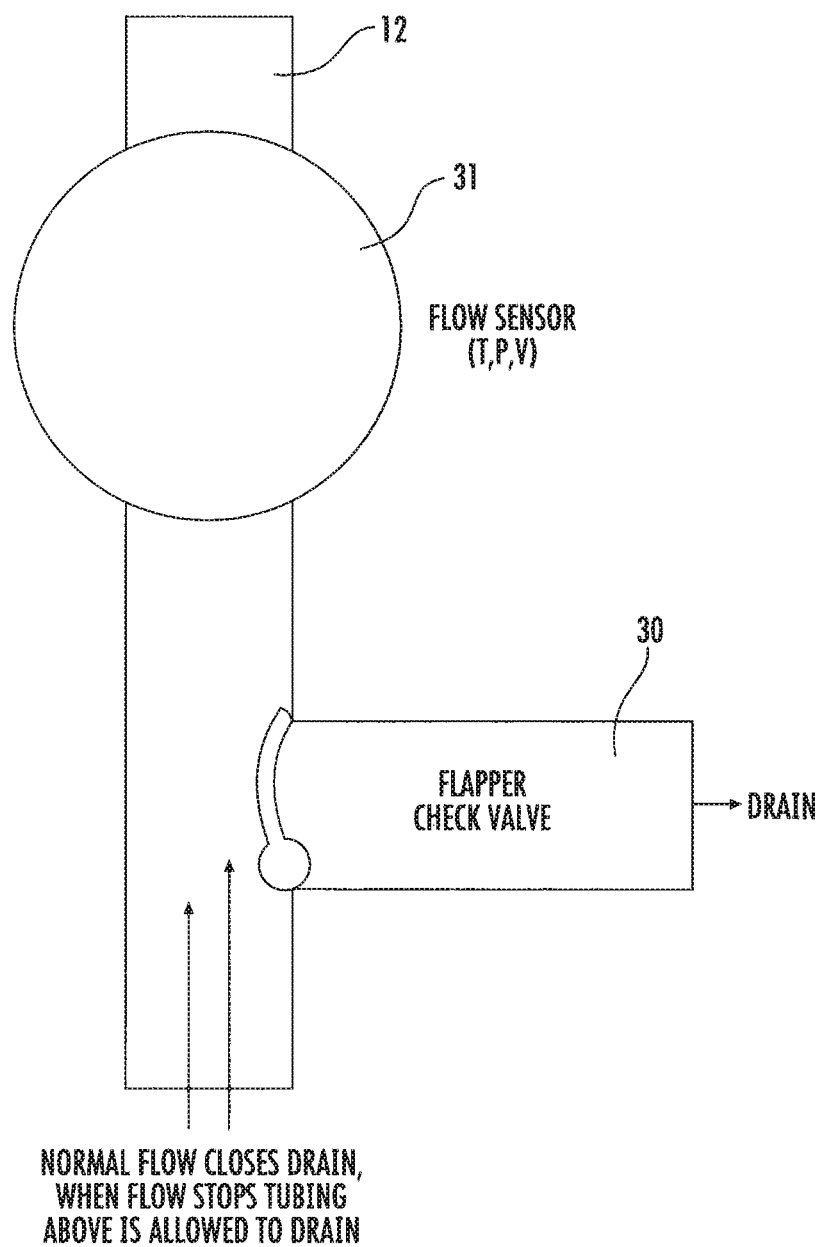
FIG. 4 is an enlarged, schematic view of a flow sensor and check valve apparatus preferably positioned in the water outlet ports positioned between the multifaceted water treatment apparatus and faucet as disclosed herein.

FIG. 4 depicts the water outlet port 12 with identical structure utilized in both the cold water outlet port 12b and the hot water outlet port 12a. Positioned within each port 12a, 12b is a flow sensor 31. In various embodiments, the flow sensor 31 may function solely as pressure switches or temperature probes. The flow sensor 31 may also function in a more complex fashion such as in the form of flow totalizers.

In one aspect, the hot water flow sensor 31a and cold water flow sensor 31b function as flow totalizers and the sensors 31 measure the user's demand when operating the faucet 1, such as positioning the handle(s) 50 for full hot water or full cold water or a combination in between. These measurements by the hot water flow sensor 31a and the cold water flow sensor 31b provide an analogue faucet mix position signal, which is determined by the flow ratios of hot and cold water. The analogue faucet mix signal is digitized by the CPU 27. The digital signal may then be utilized by the apparatus 10 to dispense the user's desired conditioned water.

Also as shown in FIG. 4 drain valve 30 operates on the basis of pressure differential to open once the faucet 1 is closed to drain away the water residing within the cold and hot water outlet ports 12a, 12b. However, these drain valves could also be electromagnet solenoid valves, of the type of valve 25 normally open to supply and normally closed to drain. This function prevents significant volumes of water from the prior use to mix with the water being dispensed pursuant to the wishes of the user. In sum, this function prevents mixing of instant hot and chilled water, ozonated and chilled water, ozonated and instant hot water, and the like.

Figure 5:
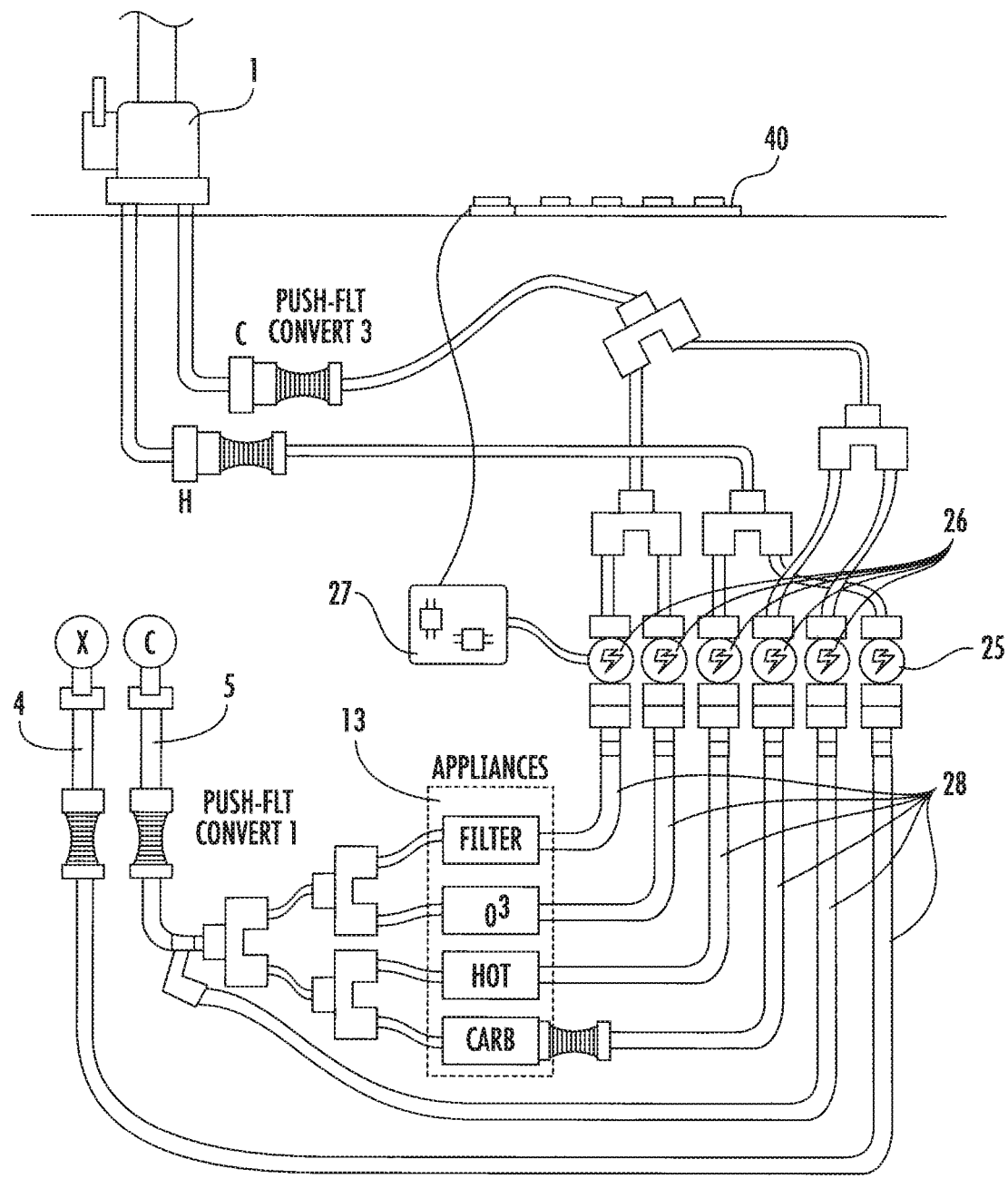
FIG. 5 is a schematic view showing piping configurations and, also, the touch capacitor control and the process control board of a multifaceted water treatment apparatus as disclosed herein.

FIG. 5 shows a schematic view of a multifaceted water treatment apparatus 10 of the present disclosure that includes various modules 13 (appliances) and one method/configuration of plumbing water/fluid conduits 28 configured so as to control and direct the water flow through it. In the embodiment shown, each flow pathway is separately controlled by a valve 25, 26, which is actuated by the ECS. The embodiment of FIG. 5 shows the use of a touch capacitor control panel 40 whereon the user selects the desired functionality of the apparatus 10.

Figure 8A:
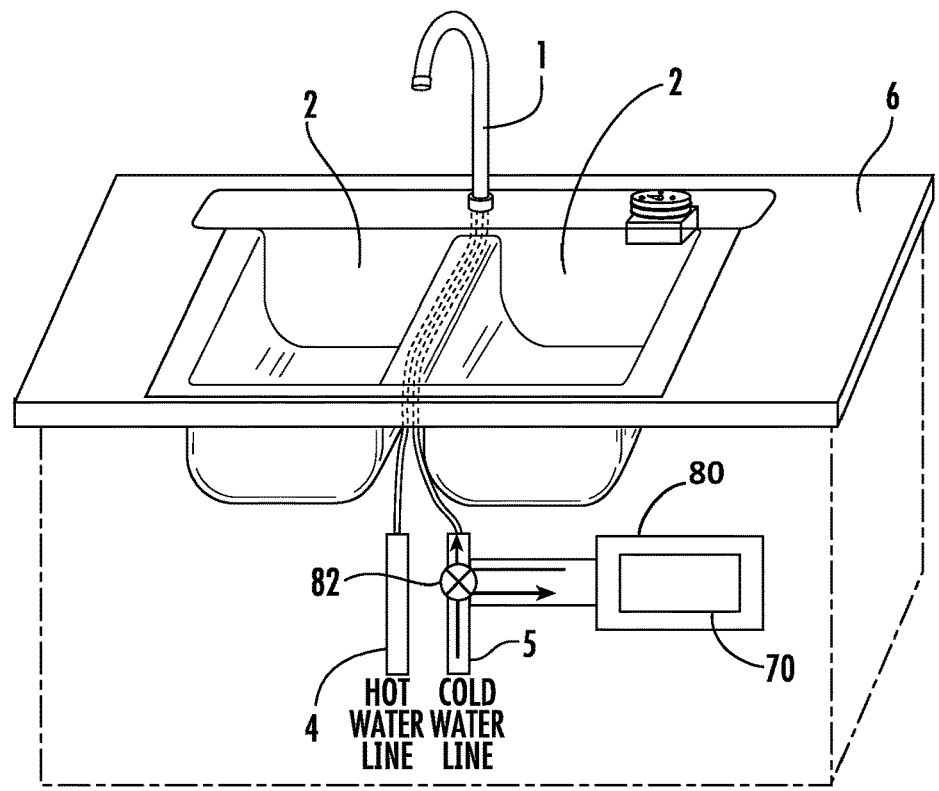
FIGS. 8A and 8B are top perspective views showing the top surface of a sink system and under-counter water system according to an aspect of the present disclosure with the movable, wireless or wired user interface token located on the sink (see FIG. 8A) or on the countertop (FIG. 8B).
Figure 8B:
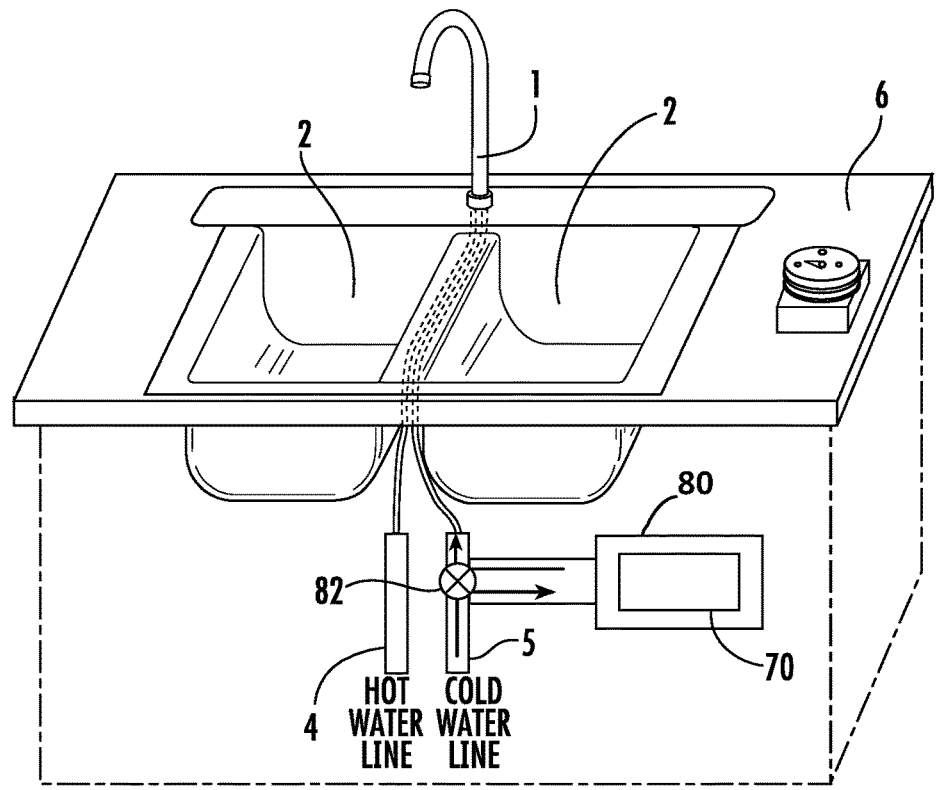
Figure 9:
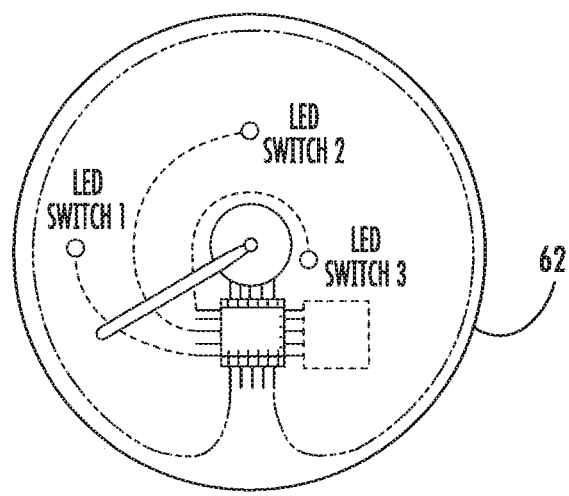
FIG. 9 is a top schematic view of a wireless control token according to an aspect of the present disclosure.
Figure 10:
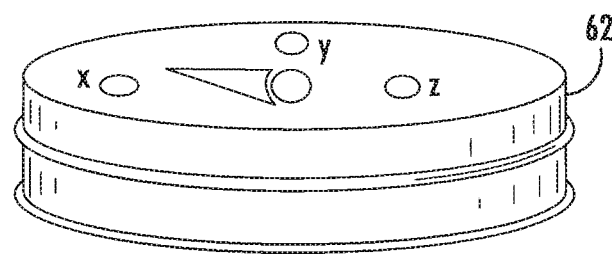
FIG. 10 is a front perspective end schematic view of a wireless or of a control token according to an aspect of the present disclosure.
Figure 11:
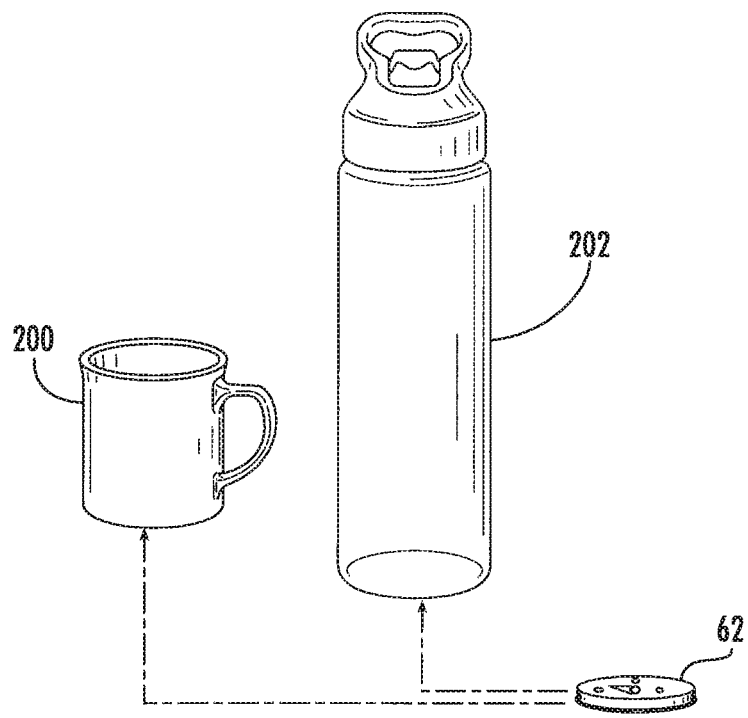
FIG. 11 is a perspective view showing possible locations of the control token placed in the bottom of a beverage vessel such as a cup or water bottle.
Figure 12:
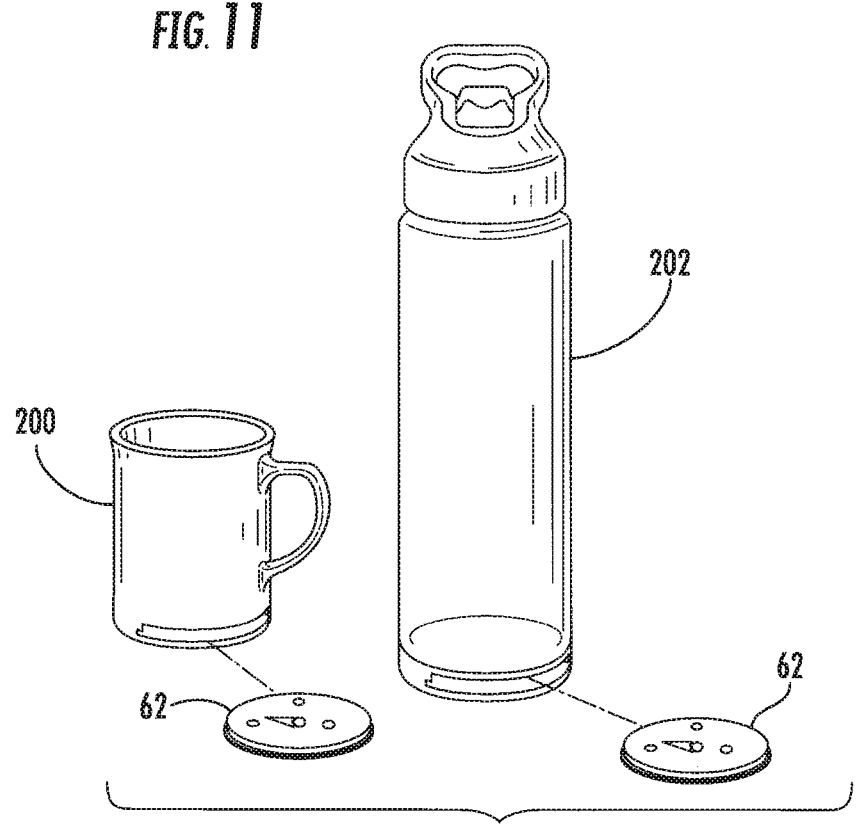
FIG. 12 is a perspective view showing the control token being inserted into a aperture located in the bottom of a beverage vessel such as a cup or water bottle.

A less complex form of the apparatus/system(s) of the present disclosure involves the filtration of water for consumption, cooking or other use without the other treatment steps described herein is shown in FIGS. 8A and 8B. This aspect of the disclosure employs a filter 70 and manifold housing 80 (typically including a filter head assembly that is not shown), which is preferably positioned under the sink. Within the housing 80 is positioned a water filter 70, which is preferably a single stage line pressure filter such as used in refrigerators, such as Whilpool EveryDrop™ Filter 2. The cold water inflow line is fitted with either a one-way or two-way valve 82, which is activated and controlled via a control apparatus preferably positioned adjacent to the faucet 1 or sink 2 on the countertop 6. The control allows the user to selectively activate filtered water which operates the valve to divert the cold water inflow stream to the manifold and through the water filter with the water thereafter flowing back and into the cold water inflow line for dispensing through the sink faucet. The control communicates with the valve assembly via a wired structure or, preferably, via a wireless method such as BLUETOOTH® or near field communication (NFC) system. Another aspect of the control is to operate a display that is activated after a preset period of time after filtered water flows into the inflow line and is dispensed, which time would correlate to the time required to fully purge the unfiltered water from the line and, thereby, inform the user that filtered water was thereafter exiting from the faucet. In addition to controlling the filtration process for the dispensed water, the control may also display the state of useful life remaining for the water filter and/or the need to replace the water filter.

Figure 6:
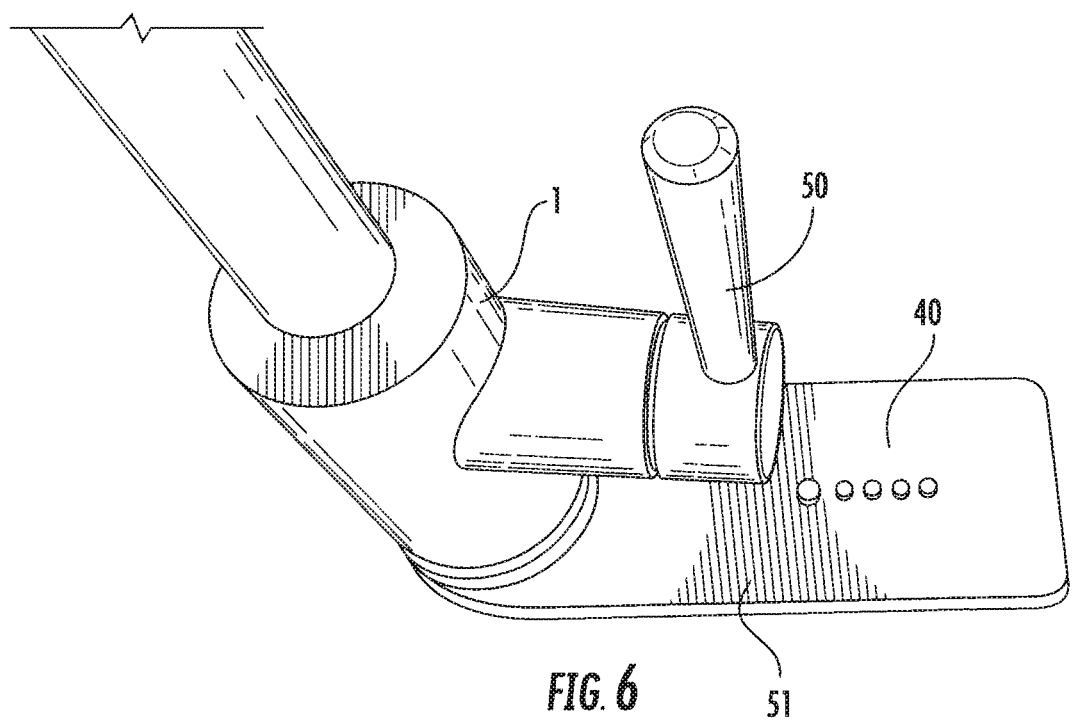
FIG. 6 is an overhead perspective view of the faucet as may be used with a multifaceted water treatment apparatus as disclosed herein and showing a touch capacitor control board positioned within the base of the faucet between the faucet and the countertop.

FIG. 6 shows the touch capacitor control panel 40 embedded as a part of the faucet base 51. The touch capacitor may be such that each of the plurality of functionalities offered by the system may be selected for use by the user and the active nature displayed to the user. A selection indicator (for example, a light (a light emitting diode, LED)) may be associated with filtered water, chilled water, heated water, ozonated water, and carbonated water. Other embodiments may employ user controls consisting of a rotary or dial selector which may be positioned within or on the faucet base 51 for ease of installation and use (see FIGS. 8A-10).

FIG. 7 shows further embodiments of the apparatus 10 which incorporate analytics and provide operational data to the user. In one embodiment, the ECS may provide an audible warning signal to the user. One such audible warning signal may occur when the instant hot water module is operating at a temperature exceeding the boiling point of water, for example. Other embodiments would provide feedback to the user with a lighted operational use display token 60, preferably using LED lighting. The token may be moveable or affixed to the faucet, sink, or countertop. It may be any shape, but is shown as a round poker-chip like device. For example, the C on the display lighted by a green LED would indicate to the user that the apparatus is set to dispense chilled water. Other letter designations may be illuminated to show, for example, the selection of carbonated chilled water. An indicator such as a solid flashing or breathing LED and/or an audible "ping" may be employed.

As shown in FIG. 7, a near-field communication system (NFC) 60 allows wireless communication between the ECS and a portable NFC reader 61, which can temporarily (while positioned proximate the reader) power the LED displays within the token 62. Such use may allow for ease of communication to the user as to the status of the filter or filters within the system and the need to change a filter based upon functional parameters rather than recommending filter change based solely upon the passage of time irrespective of usage. It also allows for the token to be removed from the surface of the sink or countertop when not in use. Typically, the reader will be positioned below the countertop to allow for easier reading and powering of the token. If positioned under the sink, it is typically positioned where there is no stainless steel or other metal sink structural material to interfere with the signal such as over the spray nozzle port in a sink. The token/chip may also be used to control or read information from other appliances such as other countertop appliances including, but not limited to, countertop coffee machines, chilled beverage machines, under-counter ice makers, trash compactors, composters or countertop integrated appliances such as cooktops and chilled food preparation devices, or battery operated devices such as a smartphone or other touch-sensitive computing devices charging station built into the countertop. Such countertop charging systems may include the QI® type inductive charging systems.

As shown in FIGS. 8A and 8B, an NFC reader/writer may be positioned below the kitchen counter that connects to an electrically controlled water T-valve 82. When the NFC reader/writer detects an NFC tag on the countertop, it will switch the T-valve to flow the water through the water filter. The NFC reader/writer will detect when water is flowing and be able to write the time of water flow to the NFC tag on the countertop to track water filter usage. The water filter length of service is also recorded to the NFC tag. When the NFC tag is first used, a color LED is flashed indicating the water is flowing through the filter. When 80% of the filter is used, a different color LED is flashed indicating that a replacement filter should be purchased. When the filter is 100% used, a different color LED will be flashed and the water T-valve will not switch to the filtered water. The NFC tag may be sold with the water filter. A used NFC tag will not activate the T-valve no matter what filter is in place. When the NFC tag is not in a read range, the T-valve will revert to passing the unfiltered water through the faucet. The NFC tag has a processor to determine which LED to flash. The NFC tag is powered through the NFC reader/writer such that no battery is needed. The NFC tag can be sized and shaped in any manner, but is typically, as discussed herein, a poker chip configuration. The NFC tag can be simply slid on a countertop until its within range of the NFC reader/writer, at which point one of the three LED's (see FIGS. 9 and 10 as well) will begin flashing indicating the water/filter status. When the NFC tag is slid out of range, the NFC reader/writer will return the flow to direct non-filtered water to the faucet. The NFC reader/writer will write to the NFC tag the usage of the filter during each instance.

The multifaceted water treatment apparatus 10 may also incorporate a number of other features beneficial to the user. Such features may include digital imaging or detection of a container such as a cup 200 or water or other beverage bottle 202 in a dispensing zone defined by location of the cup/container relative to the faucet adjacent electronic user interface. The user interface could provide a visual/audible signal to the user once the cup/container and faucet outlet are within range of the digital imaging device embedded within the user interface. For example, an LED or LED's light about all or a portion of the perimeter may illuminate to convey information to the user such as filter life remaining or, for example, how much water the user should still drink on a given day. More lights, the more a user has to drink, for example. Further, a hands free, controlled autofill system, select fill dispensing system or measured fill water dispenser system may be incorporated into embodiments of the apparatus 10. In this manner, the system may recognize the container and thereby the preferred beverage of the user and set the system to provide the desired treated water to the user for that beverage.

The multifaceted water treatment apparatus 10 functions at the direction of the user. In one embodiment, the user first selects the desired water treatment options by way of touching the touch capacitor control panel 40 or use of the other control element (see FIG. 6). Thereafter, all that is required of the user is to use the faucet 1 to turn on the cold water flow by use of the handle 50. In another embodiment, where the user only wants hot or cold water, the user opens up the faucet 1 as desired, and the sensors 31 within the intake ports 12 immediately determine the desired temperature of the water and by use of the PCS, divert the water flow to the appropriate piping within the apparatus 10 and, further, activate the module 13 as may be required to provide water of a temperature differing from the original household water temperature. In yet a differing embodiment, the user is able to maintain the apparatus 10 by use of a near-field communication system (NFC) 61 utilizing a portable reader 62 such as a portable touch-sensitive phone incorporating a reader, which reports to the user the status of the apparatus components, in particular the remaining useful life of the filter(s) used within the filter module 20 of the apparatus 10.

It is important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible variations on functionality with use of differing modules, differing analytics/reporting to the user, differing user interface methods) each employed without materially departing from the novel teachings and advantages of the subject matter recited. For further example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is to be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:
1. A water treatment apparatus comprising:
   at least one module which operatively and selectively treats water flowing through the at least one module and treats cold water received from an original household cold water line that flows through;
   wherein the at least one module includes a water filtration module in liquid communication with both the house- hold cold water line and a hot water heater module for providing filtered on-demand instant hot water to a user;

a process control unit whereby a user selects a desired treatment option for the water flowing through the apparatus to be dispensed to the user;

one or more plumbing connections which operatively divert the water received from the original household cold water line to the user selected water treatment module so as to dispense to the user the selected treated water; and one or more valves which operatively cooperate with the process control unit to direct the water flow within the apparatus so as to provide the user with the selected treated water;

a cold water outlet downstream of the user selected water treatment module and configured to attach to a faucet, the cold water outlet having a drain line;

a flapper check valve disposed within the cold water outlet, wherein the flapper check valve operatively opens so as to drain away the water retained within the cold water outlet to the drain line upon closure of the faucet.

2. The apparatus of claim 1, wherein the at least one module further comprises at least one of the following: carbonated water module in fluid connection with the water filtration module, ozonated water module, and a chilled water module configured to provide cold water at a temperature of from about 38° F. to 32° F.

3. The apparatus of claim 2, wherein the process control unit is an electronic control system that utilizes a process control board.

4. The apparatus of claim 1 further comprising a control assembly whereby the user may select the water treatment desired for the water dispensed by way of the faucet to the user and the desired treatment option is one of a plurality of treatment options.

5. The apparatus of claim 1 further comprising a housing containing the apparatus and wherein the housing is mounted under a countertop of a kitchen.

6. The apparatus of claim 1, wherein original household hot water and original household cold water may bypass the apparatus for dispensing through the faucet.

7. The apparatus of claim 1, wherein inlet ports direct the flow from the original cold water line and an original household hot water line from the apparatus to the faucet.

8. The apparatus of claim 1, wherein the one or more valves operatively cooperating with the process control unit are actuated by the selection of the user utilizing the process control unit.

9. The apparatus of claim 1, wherein a second flapper check valve is positioned within a hot water outlet and the second flapper check valve operatively opens upon closure of the faucet so as to drain away the water retained within the hot water outlet to a hot water drain line.

10. The apparatus of claim 9, wherein the apparatus further comprises at least one water flow sensor positioned between at least one of the flapper check valves and the faucet.

11. The apparatus of claim 10, wherein the at least one water flow sensor comprises two water flow sensors with a first water flow sensor positioned between the flapper check valve of the hot water outlet and the faucet and a second water flow sensor positioned between the flapper check valve of the cold water outlet and the faucet.

12. The apparatus of claim 11, wherein the at least one water flow sensor measures a volume of water and a temperature of water through the at least one flow sensor and wherein the first and second water flow sensors are in communication with the process control unit.

13. The apparatus of claim 12, wherein the process control unit operatively adjusts the valves within the apparatus so as to provide water at a temperature selected by the user's positioning of the faucet.

14. The apparatus of claim 1, wherein one or more filters are employed to process the water stream flowing therethrough.

15. The apparatus of claim 1 wherein the hot water heater module provides water at a temperature of from about 180° F. to about boiling-.

16. A water treatment apparatus comprising:

at least one module which operatively treats the water flowing through the at least one module and treats cold water received from an original household cold water line that flows through;

a process control unit whereby a user selects a desired treatment option for the water flowing through the apparatus to be dispensed to the user wherein the desired treatment options include filtered water and one or more of: on-demand hot water at a temperature of from about 180° F. to about 212° F.; on-demand cold water at a temperature of from about 43° F. to about 32° F.; and ozonation;

one or more plumbing connections which operatively divert the original household cold water flow to the user selected water treatment module so as to dispense to the user the selected treated water;

one or more valves which operatively cooperate with the process control unit to direct the water flow within the apparatus so as to provide the user with the selected treated water; and a near-field communication (NFC) system operatively connected to one or more modules of the apparatus which provides apparatus status information to the user by way of a NFC reader and an NFC tag token that is not physically connected to any other component of the water treatment apparatus and wherein the NFC tag token does not include a battery, but includes a processor that is processed by the NFC reader and records filter use information and indicates to a user when filtered water is not being provided when positioned proximate the reader and after the useful life of a water filter delivering the filtered water;

wherein a flapper check valve is positioned within a cold water outlet and the flapper check valve is configured to operatively open upon closure of a faucet so as to drain away the water retained within the cold water outlet to a drain line.

17. The apparatus of claim 16, wherein the apparatus further comprises a water flow sensor positioned between the flapper check valve and the faucet.

18. The apparatus of claim 17, further comprising a second water flow sensor positioned between a second flapper check valve of a hot water outlet and the faucet.

* * * * *